United States Patent
Cheng et al.

(10) Patent No.: US 8,755,190 B2
(45) Date of Patent: Jun. 17, 2014

(54) HOUSING OF ELECTRONIC DEVICE AND ELECTRONIC DEVICE

(75) Inventors: Ching-Hung Cheng, Hsinchu (TW); Yun-Wei Tsai, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 106 days.

(21) Appl. No.: 13/338,246

(22) Filed: Dec. 28, 2011

(65) Prior Publication Data
US 2013/0107490 A1 May 2, 2013

(30) Foreign Application Priority Data

Nov. 2, 2011 (TW) ............................. 100140031 A

(51) Int. Cl.
*H05K 5/00* (2006.01)

(52) U.S. Cl.
USPC ..................................... 361/730; 361/679.01

(58) Field of Classification Search
USPC ............ 361/600, 679.01, 728–730, 681, 752, 361/807; 349/58–60
See application file for complete search history.

(56) References Cited

U.S. PATENT DOCUMENTS

| 2006/0002066 | A1 | 1/2006 | Doczy et al. |
| 2006/0066769 | A1* | 3/2006 | Minaguchi et al. ............. 349/58 |
| 2012/0206895 | A1* | 8/2012 | Shirasaka et al. ............. 361/807 |
| 2012/0320515 | A1* | 12/2012 | Murakami ............... 361/679.26 |
| 2013/0135794 | A1* | 5/2013 | Wang et al. .............. 361/679.01 |

FOREIGN PATENT DOCUMENTS

| CN | 1717163 A | 1/2006 |
| CN | 2886633 | 4/2007 |
| CN | 102026511 | 4/2011 |
| JP | 2000105628 | 4/2000 |
| TW | M364889 | 9/2009 |
| TW | M374247 | 2/2010 |
| TW | I321121 | 3/2010 |

* cited by examiner

*Primary Examiner* — Bernard Rojas
(74) *Attorney, Agent, or Firm* — Jianq Chyun IP Office

(57) ABSTRACT

A housing of an electronic device includes a first housing body, a second housing body and a buffer. The first housing body defines an accommodating recess. The second housing body is assembled to the first housing body and adapted to be foldable relative to the first housing body. The buffer is disposed on the second housing body. In a closed position, the second housing body and the first housing body are stacked with each other, the accommodating recess is recessed away from the second housing body, the buffer faces the first housing body, and the buffer substantially overlaps with a fringe of the accommodating recess.

21 Claims, 8 Drawing Sheets

HOUSING OF ELECTRONIC DEVICE AND ELECTRONIC DEVICE

CROSS-REFERENCE TO RELATED APPLICATION

This application claims the priority benefit of Taiwan application serial no. 100140031, filed on Nov. 2, 2011. The entirety of the above-mentioned patent application is hereby incorporated by reference herein and made a part of this specification.

BACKGROUND OF THE INVENTION

1. Field of the Invention

The present invention relates to an electronic device, and more particularly, to a housing of an electronic device.

2. Description of Related Art

With the development of technology, electronic devices have been indispensable in our lives. In general, a foldable electronic device consists of two housing bodies. One housing body (hereinafter referred to as first housing body) may be used to receive an input device and system, and the other housing body (hereinafter referred to as second housing body) may be used to receive a display module. When the foldable electronic device is not in use, the first and second housing bodies can be closed to protect the inside display apparatus and/or the input device. To avoid the occurrence of mis-touch in the closed state of the electronic device, the first housing body of the foldable electronic device is usually provided with a recessed area for accommodating the input device. As a result, a step with varying height is formed on a surface of the first housing body that faces the second housing body.

When the closed electronic device is subject to a pressure, the second housing body may abut against a fringe (i.e. the location of the step) of the recessed area of the first housing body, which may causes the second housing body to experience a stress concentration. If this occurs, the display apparatus in the second housing body will be subject to a pressure, which may result in breakage and further generate a bright spot. As the electronic device trends toward thin volume, the thickness of the display apparatus of the electronic device is becoming smaller and smaller. As a result, the stress concentration caused at the fringe of the recessed area becomes more apparent, and the occurrence of breakage and bright spot of the display apparatus also becomes more apparent accordingly.

SUMMARY OF THE INVENTION

Accordingly, the present invention is directed to a housing of an electronic device that has a buffering capability to reduce the occurrence of breakage of the electronic device.

The present invention is also directed to an electronic device which includes a housing designed to help reduce the occurrence of breakage of components.

The present invention provides a housing of an electronic device, including a first housing body, a second housing body and a buffer. The first housing body defines an accommodating recess. The second housing body is assembled to the first housing body and adapted to be foldable relative to the first housing body. The buffer is disposed on the second housing body. In a closed position, the second housing body and the first housing body are stacked with each other, the accommodating recess is recessed away from the second housing body, the buffer faces the first housing body, and the buffer substantially overlaps with a fringe of the accommodating recess.

The present invention further provides an electronic device including a first housing body, a second housing body, a display module and a buffer. The first housing body defines an accommodating recess. The second housing body is assembled to the first housing body and adapted to be foldable relative to the first housing body. The display module is received in the second housing body with the second housing body exposing a display surface of the display module. The buffer is disposed on the second housing body and between the display module and the second housing body. In a closed position, the second housing body and the first housing body are stacked with each other, the accommodating recess is recessed away from the second housing body, the display surface faces the first housing body, and the buffer substantially overlaps with a fringe of the accommodating recess.

In one embodiment of the present invention, the fringe of the accommodating recess forms a linear path extending across the first housing body.

In one embodiment of the present invention, the fringe of the accommodating recess forms a closed pattern.

In one embodiment of the present invention, the accommodating recess of the first housing body is adapted to accommodate a keyboard, a touch pad or a key.

In one embodiment of the present invention, the second housing body includes a first part and a second part assembled together, the buffer is disposed on the first part, and when the first housing body and the second housing body are closed, the second part is located between the first part and the first housing body.

In one embodiment of the present invention, the second housing body is adapted to receive the display module, the display module is sandwiched between the first part and the second part, the buffer is located between the display module and the first part, and the second part defines an opening through which the display surface of the display module is exposed.

In one embodiment of the present invention, the buffer forms a continuous pattern.

In one embodiment of the present invention, the buffer forms a discontinuous pattern having multiple segments.

In one embodiment of the present invention, the buffer is formed by a sponge, a metal gasket or rubber.

In one embodiment of the present invention, the hardness of the buffer is less than the hardness of the first housing body.

In one embodiment of the present invention, the depth d of the accommodating recess is substantially 1.6 mm to 2.0 mm.

In view of the foregoing, the housing of the electronic device of the present invention includes two housing bodies, i.e. the first housing body and the second housing body. The first housing body is provided with the recess for accommodating another component, and the second housing body is provided with the buffer. The buffer substantially overlaps with the fringe of the accommodating recess when the first housing body and the second housing body are stacked with each other in the closed position. Therefore, if the electronic device having the housing is subject to an external force when the first housing body and the second housing body are in the closed position, the buffer can disperse the stress to reduce the occurrence of breakage of the electronic device corresponding to the fringe of the accommodating recess.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1A:
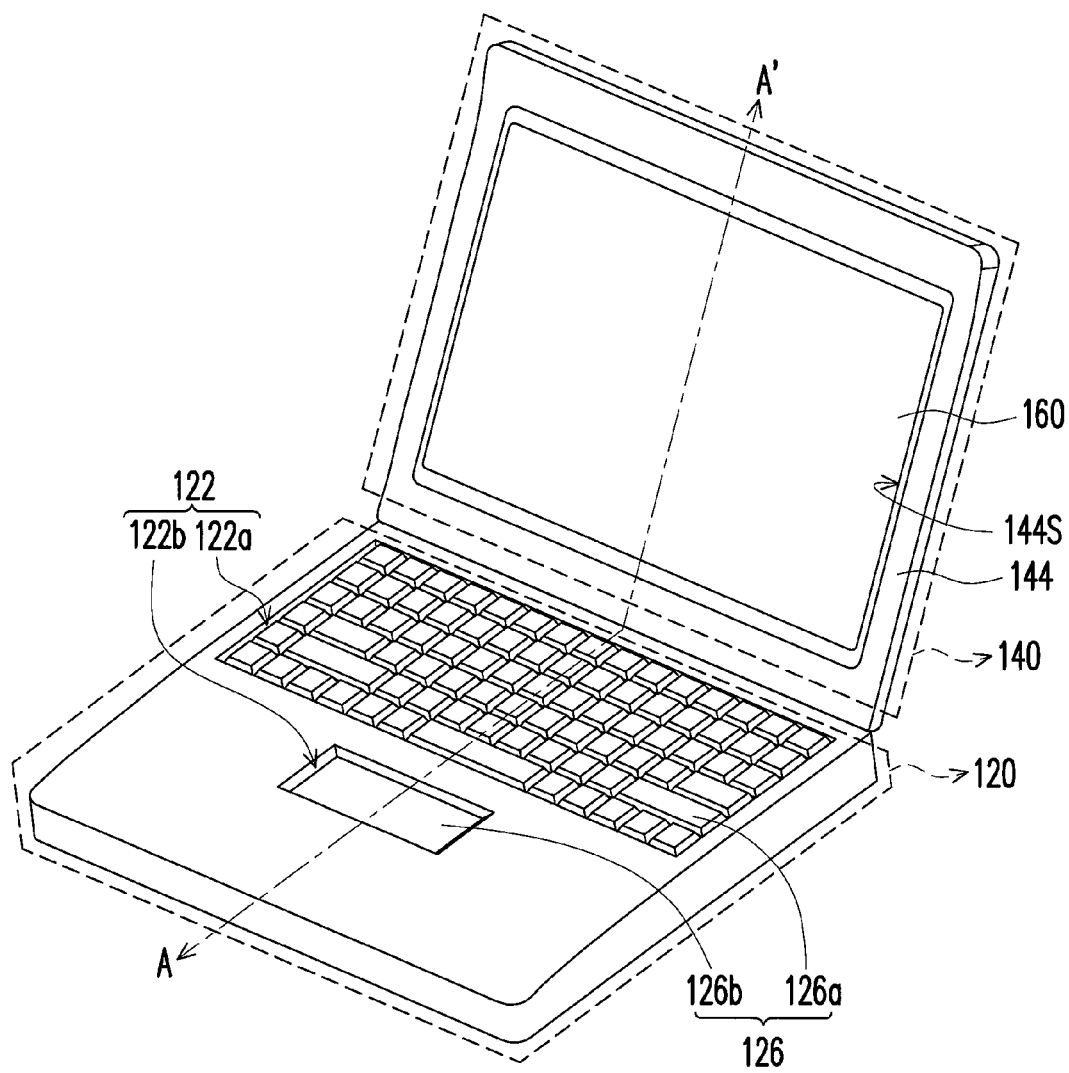
FIG. 1A illustrates an electronic device according to one embodiment of the present invention.
Figure 1B:
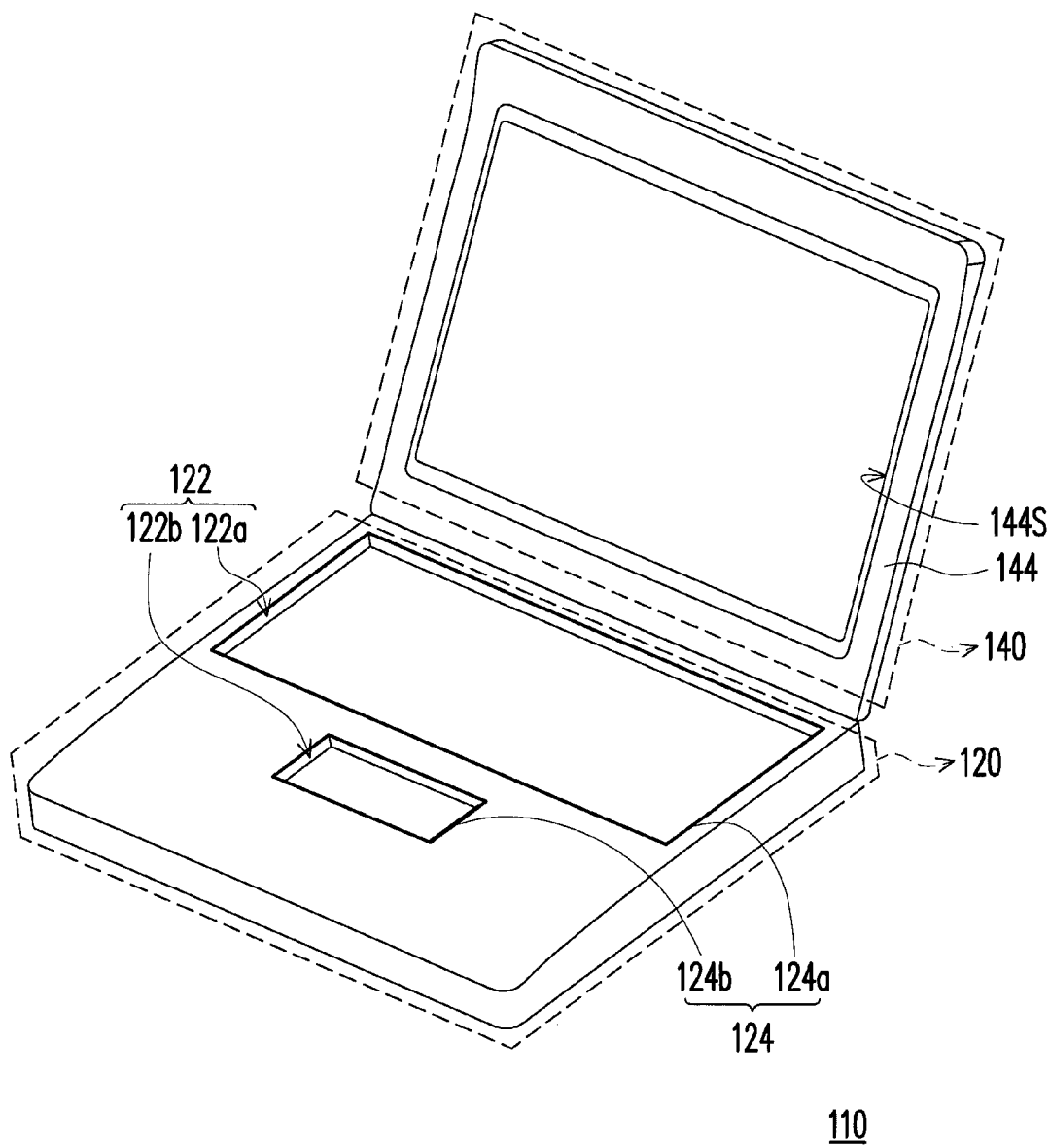
FIG. 1B illustrates a housing of the electronic device of FIG. 1A.
Figure 1C:
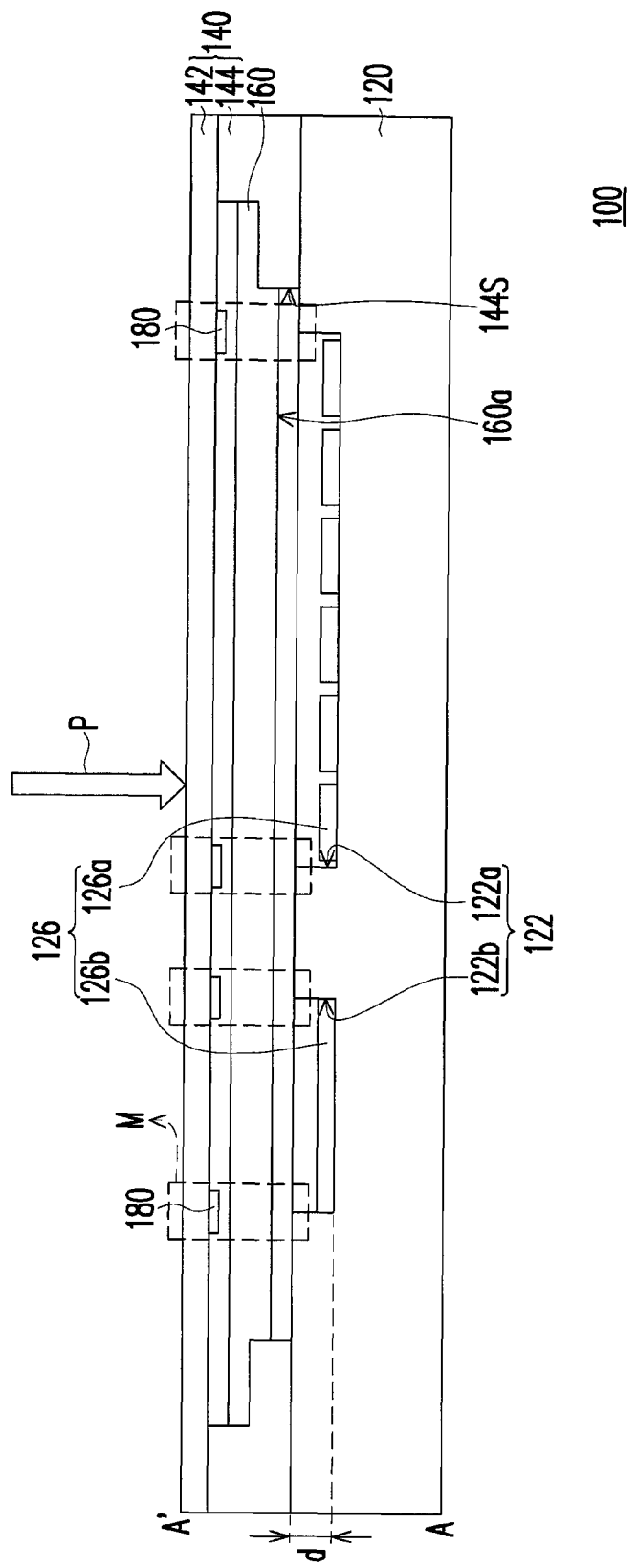
FIG. 1C is a cross-sectional view of the electronic device of FIG. 1A in a closed state, taken along line A-A' thereof.

FIG. 1A illustrates an electronic device 100 according to one embodiment of the present invention. FIG. 1B illustrates a housing 110 of the electronic device 100 of FIG. 1A. In addition, FIG. 1C is a cross-sectional view of the electronic device 100 of FIG. 1A in a closed state, taken along line A-A' thereof. Referring to FIG. 1A, FIG. 1B and FIG. 1C, the present electronic device 100 includes a first housing body 120, a second housing body 140, a display module 160, and a buffer 180. The first housing body 120 defines an accommodating recess 122. The second housing body 140 can be assembled to the first housing body 120 to form a housing 110 of the electronic device 100, with the second housing body 140 adapted to be foldable relative to the first housing body 120. The display module 160 is received in the second housing body 140 and the second housing body 140 exposes a display surface 160a of the display module 160. The buffer 180 is disposed on the second housing body 140 and between the display module 160 and the second housing body 140.

In general, the first housing body 120 is provided with the accommodating recess 122 so as to form a step structure with varying height on a surface of the first housing body 120 facing the second housing body 140. In the present embodiment, a fringe 124 of the accommodating recess 122 may be considered as the ridgeline portion of the step structure. The configuration of the ridgeline portion may be a line or a strip-like slope having a width. That is, although the fringe 124 described herein is depicted by a line in FIG. 1A and FIG. 1B, the fringe 124 can be a strip-like area having a width. Further, in the present embodiment, the first housing body 120 includes, for example, at least two types of accommodating recesses 122 including an accommodating recess 122a and an accommodating recess 122b. A fringe 124a of the accommodating recess 122a and a fringe 124b of the accommodating recess 122b each form a closed pattern. The closed pattern is, but not limited to, for example, a frame in shape. In another embodiment, the fringe 124 of the accommodating recess 122 may form a non-closed pattern.

An input interface 126a and an input interface 126b may be disposed in the accommodating recess 122a and accommodating recess 122b, respectively. The input interface 126a is, for example, a keyboard, and the input interface 126b is, for example, a touch pad. It is noted that the input interface 126 should not be limited to this particular arrangement. Rather, in other embodiments, the input interface 126 may be, for example, a key, another suitable interface, or another element such as a sensor. In addition, the present invention is not intended to limit the number of the accommodating recess 122 of the electronic device 100 to two. In other embodiments, the number of the accommodating recess 122 may be one, three or another suitable number depending on actual requirements.

The second housing body 140 includes a first part 142 and a second part 144. The buffer 180 is disposed on the first part 142. Upon assembly, the first part 142 and the second part 144 form the second housing body 140. The buffer 180 is, for example, formed by a sponge, a metal gasket or rubber. Specifically, the hardness of the buffer 180 is less than the hardness of the first housing body 120 so as to provide the desired buffering function. In addition, the second housing body 140 may receive the display module 160 therein, with the display module 160 sandwiched between the first part 142 and the second part 144 and with the buffer 180 located between the first part 142 and the display module 160. Furthermore, the second part 144 defines an opening 144S to expose the display surface 160a of the display module 160.

When the first housing body 120 and the second housing body 140 are closed (i.e. in the state shown in FIG. 1C), the second housing body 140 and the first housing body 120 are stacked together, and the display surface 160a of the display module 160 faces the first housing body 120. In addition, the second part 144 is located between the first housing body 120 and the display module 160. The accommodating recess 122 is recessed in a direction away from the second housing body 140, with a recessing depth d substantially ranging, for example, from 1.6 mm to 2.0 mm.

When the electronic device 100 of the present invention is in the closed position shown in FIG. 1C, the buffer 180 is positioned to overlap with the fringe 124 of the corresponding accommodating recess 122. In brief, assuming the buffer 180 is disposed on the first part 142 in a region M, the fringe 124 of the accommodating recess 122 of the first housing body 120 is orthogonally projected on the second housing body 140 inside the region M.

Referring again to FIG. 1C, when an external force P is applied to the electronic device 100 in a direction from the second housing body 140 to the first housing body 120, because of the step structure at the fringe 124a of the accommodating recess 122a, the fringe 124a of the accommodating recess 122a would cause a stress concentration in the region M of the second housing body 140. However, because the buffer 180 is disposed on the second housing body 140 in the region M and overlaps with the corresponding trace of the fringe 124a of the accommodating recess 122a, and the hardness of the buffer 180 is less than the hardness of the first housing body 120, the buffer 180 can disperse the stress, thus reducing the stress concentration on the display module 160 in the region M caused by the fringe 124a of the accommodating recess 122a.

In other words, the hardness of the buffer 180 is less than the hardness of the first housing body 120 and, therefore, the buffer 180 has the buffering effect of stress dispersion. In addition, the area of the buffer 180 completely shields the overlapped fringe 124a of the accommodating recess 122a and, therefore, the buffer 180 can reduce the pressure concentrated on the second housing body 140 in the region M that is caused by the external force, thereby the occurrence of bright spot or breakage of the display module 160 due to pressure thereon can be significantly reduced.

Figure 2A:
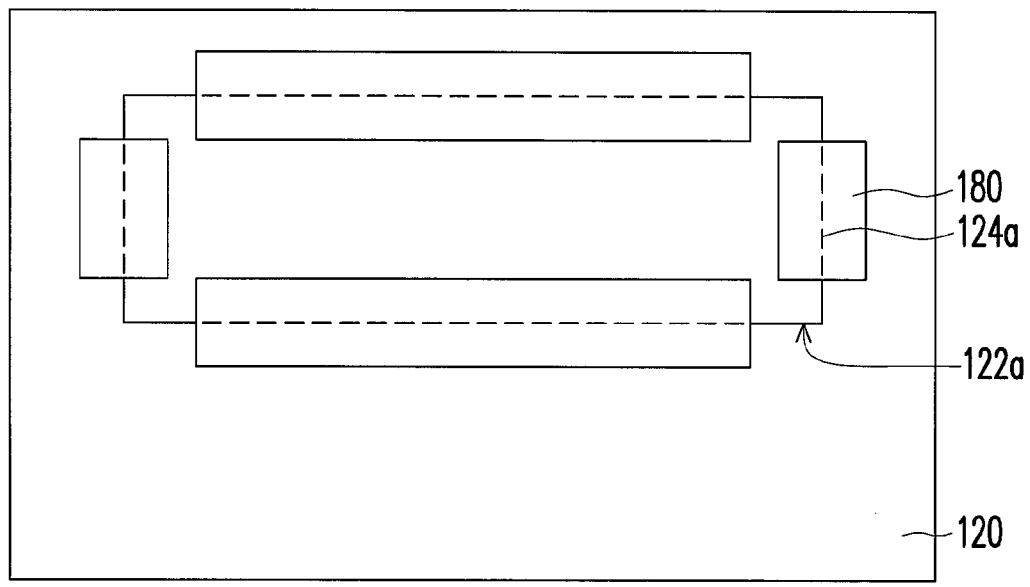
FIG. 2A to FIG. 2D illustrate distributions of the accommodating recess and buffer of the electronic device according to several embodiments of the present invention.

FIG. 2A illustrates a distribution of the accommodating recess 122a and buffer 180 of the electronic device 100 according to one embodiment of the present invention. It should be pointed out that, in order to avoid repeated description, FIG. 2A illustrates only the distribution of the accommodating recess 122a and the corresponding buffer 180, with the distribution of the accommodating recess 122b and the corresponding buffer 180 being omitted. Referring to FIG. 2A, specifically, in the present embodiment, the buffer 180 is discontinuous and may have multiple segments that are disposed substantially along a frame-shaped path. When the buffer 180 is disposed on the housing 110 shown in FIG. 1B, the frame-shaped path defined by the buffer 180, for example, corresponds to the fringe 124a of the accommodating recess 122a. That is, when the first housing body 120 and the second housing body 140 are stacked with each other and the housing 110 of the FIG. 1B is in the closed state, the area of the projection of the buffer 180 onto the first housing body 120 can cover or at least partially overlap with the fringe 124a.

In other words, when the first housing body 120 and the second housing body 140 are pivotably coupled to each other at a pivot axis, the distance from the buffer 180 to the pivot axis may be substantially equal to the distance from the fringe 124 of the accommodating recess 122 to the pivot axis. To put it differently, the distance from an edge of the frame-shaped path of the buffer 180 to the pivot axis is substantially equal to the distance from the fringe 124 of the accommodating recess 122 to the pivot axis. In addition, if the border of the housing 110 is used as the reference, the distance from the buffer 180 to the border of the housing 110 can be substantially equal to the distance from the fringe 124 of the accommodating recess 122 to the border of the housing 110. To put it differently, the distance from the edge of the frame-shaped path of the buffer 180 to the border of the housing 110 is substantially equal to the distance from the fringe 124 of the accommodating recess 122 to the border of the housing 110.

However, the present invention should not be limited to this particular design. In other embodiments, the buffer 180 may also form a continuous frame-shaped path. Several other embodiments are described below to further show the distribution of the buffer 180 and the fringe 124a of the accommodating recess 122a. It is noted that, in the following embodiments, elements that are the same as or similar to those in the previous embodiments are given the same reference numerals. In addition, in the following embodiments, the relationship between the buffer 180 and the accommodating recess 122a is described when the first housing body 120 and the second housing body 140 of FIG. 1A to FIG. 1C are stacked with each other so that they are in a closed state. However, when the first housing body 120 and the second housing body 140 are in an opened state, the buffer 180 and the accommodating recess 122a are located in different unparallel planes and do not have the below-described relationship therebetween.

Figure 2B:
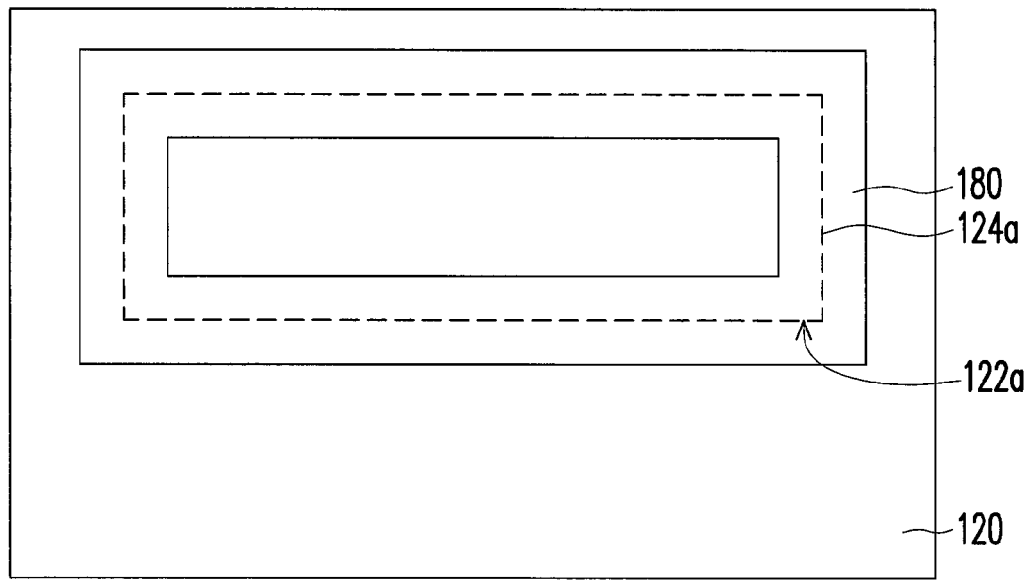

FIG. 2B illustrates a distribution of the accommodating recess 122a and the buffer 180 of the electronic device 100 according to another embodiment of the present invention. Referring to FIG. 2B, in the present embodiment, the buffer 180 is distributed continuously along the fringe 124a of the accommodating recess 122a thus forming a continuous frame-shaped pattern.

Figure 2C:
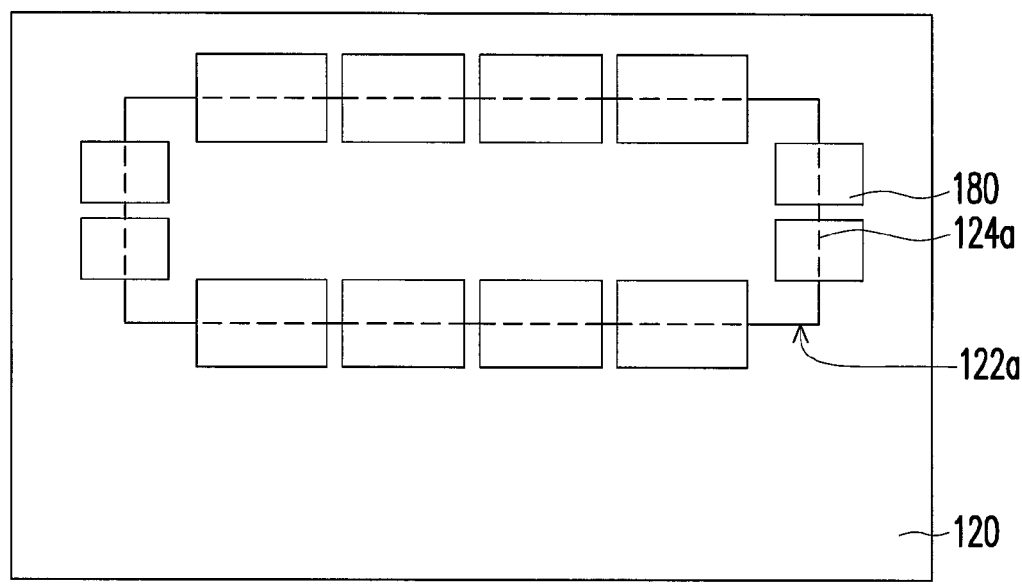

FIG. 2C illustrates a distribution of the accommodating recess 122a and the buffer 180 of the electronic device 100 according to another embodiment of the present invention. Referring to FIG. 2C, in the present embodiment, the buffer 180 is distributed along the fringe 124a of the accommodating recess 122a. When the fringe 124a forms a rectangle pattern, the buffer 180 on each side of the rectangle pattern may be divided into at least two segments, thus forming a discontinuous frame-shaped pattern.

Figure 2D:
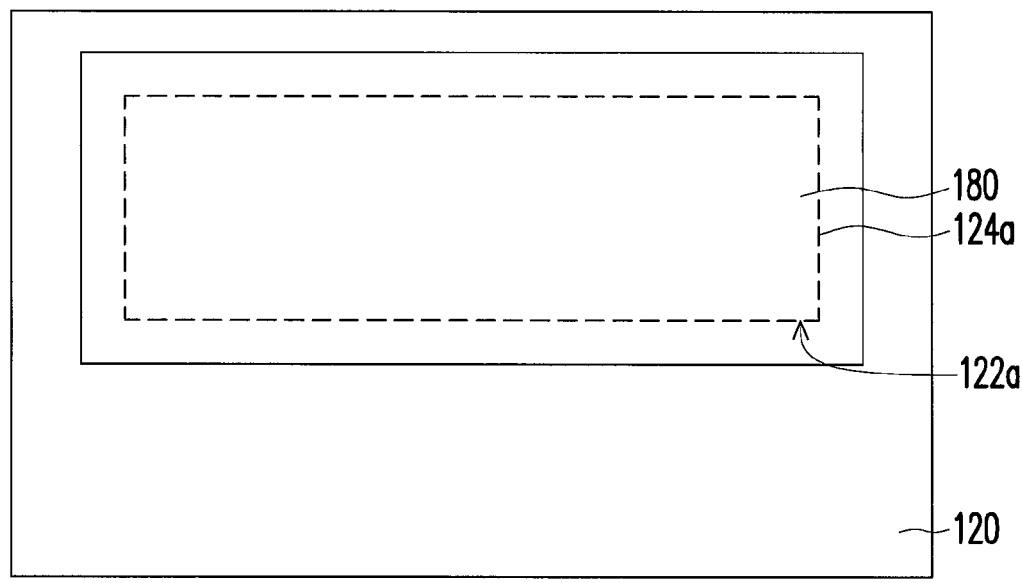

FIG. 2D illustrates a distribution of the accommodating recess 122a and the buffer 180 of the electronic device 100 according to still another embodiment of the present invention. Referring to FIG. 2D, in the present embodiment, the buffer 180 overlaps with the entire accommodating recess 122a, the first housing body 120 and the second housing 140 are stacked with each other so that they are in the closed state, and the area of the projection of the buffer 180 on the first housing body 120 is greater than the area of the accommodating recess 122a.

As can be seen from the distributions of the accommodating recess 122a and the buffer 180 of the electronic device 100 of FIG. 2A to FIG. 2D, the buffer 180 of the present invention substantially overlaps with the fringe 124a of the accommodating recess 122a. In other words, when the first housing body 120 and the second housing body 140 are stacked with each other so that they are in the closed state, the buffer 180 may continuously and completely cover the fringe 124a of the accommodating recess 122a, or discontinuously and segmentally cover the fringe 124a of the accommodating recess 122a. Therefore, as long as the buffer 180 is disposed on the second part 144 in the region M corresponding to the fringe 124a of the accommodating recess 122a, a stress dispersion effect can be provided.

It is noted that the following embodiments continue to use the reference numerals and partial contents of the previous embodiments, where the same reference numerals refer to the same or similar elements, and contents that are the same as in the previous embodiments are omitted. Those omitted contents have been described in the previous embodiments and are therefore not repeated herein.

Figure 3A:
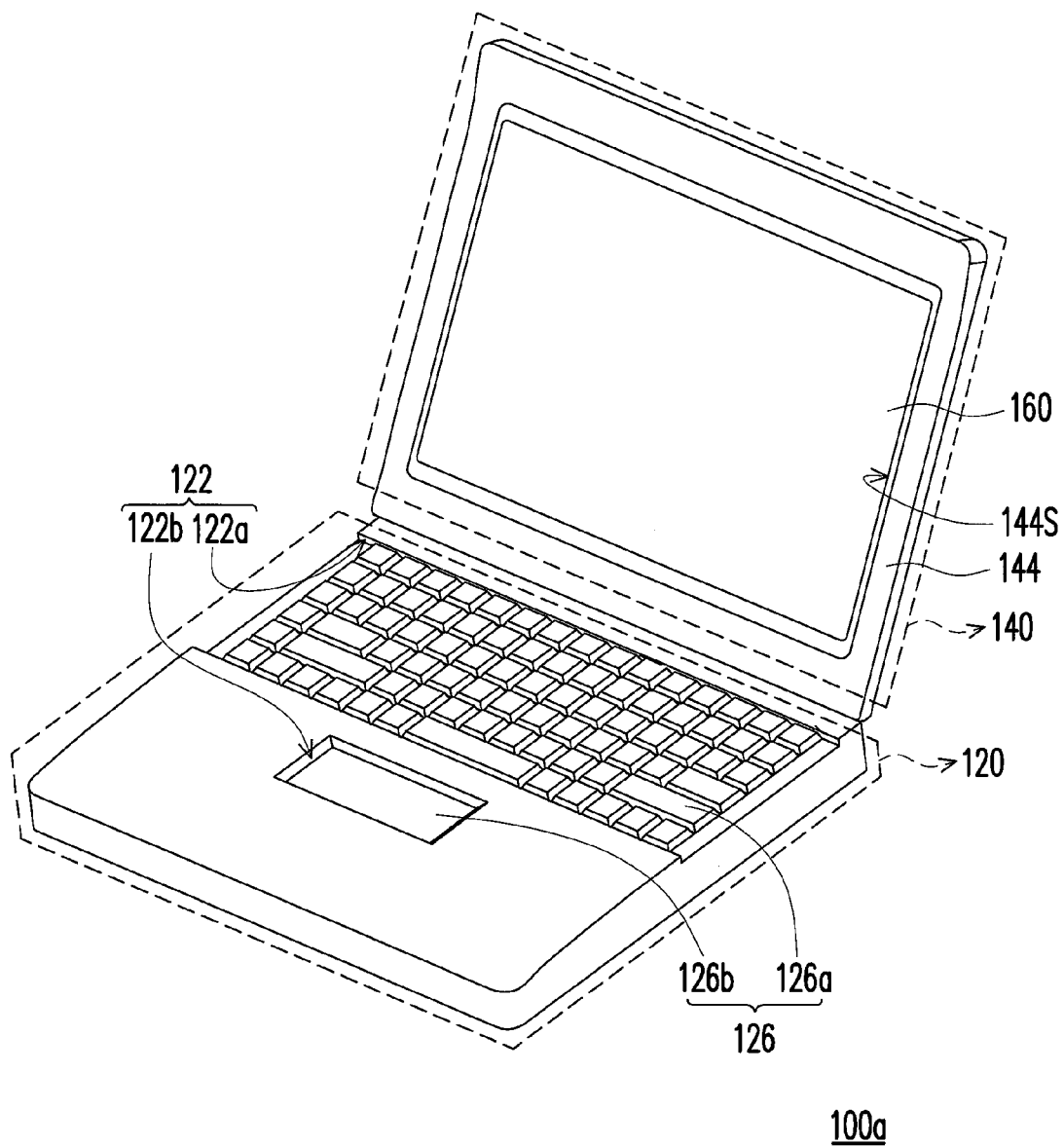
FIG. 3A illustrates an electronic device according to another embodiment of the present invention.
Figure 3B:
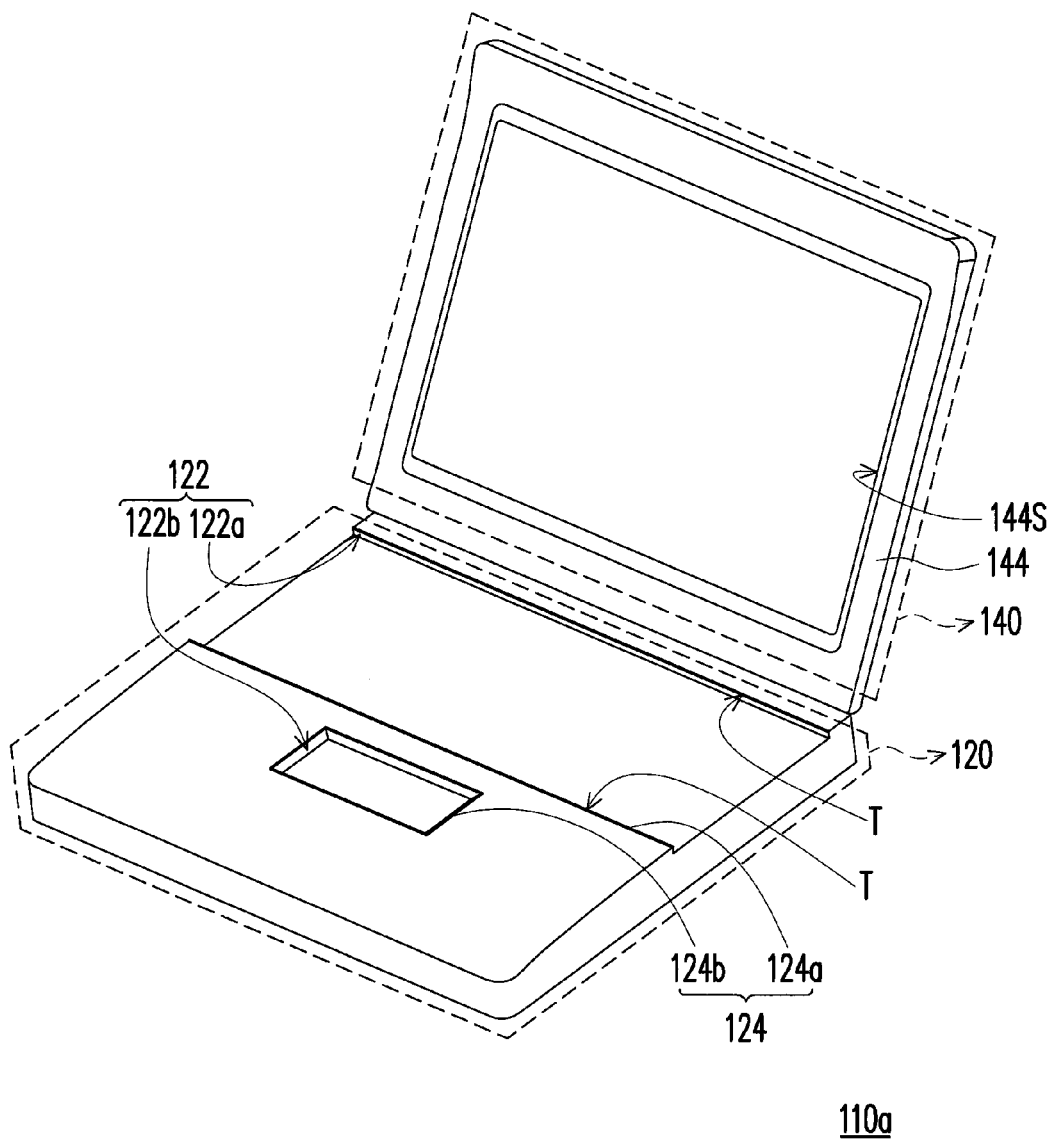
FIG. 3B illustrates the housing of the electronic device according to another embodiment of the present invention.

FIG. 3A illustrates an electronic device 100a according to another embodiment of the present invention. In order to clearly show the construction of various components of the electronic device 100a of the present embodiment, a housing 110a of the electronic device 100a is separately illustrated below. FIG. 3B illustrates a housing 110a of the electronic device 100a according to another embodiment of the present invention. Referring to FIG. 3A and FIG. 3B, the electronic device 100a of the present embodiment includes a first housing body 120, a second housing body 140, and a display module 160.

The first housing body 120 defines an accommodating recess 122. The second housing body 140 can be assembled to the first housing body 120 to form a housing 110 of the electronic device 100, with the second housing body 140 adapted to be foldable relative to the first housing body 120. The second housing body 140 includes a first part 142 and a second part 144 assembled together. The second part 144 defines an opening 144S. The display module 160 is received in the second housing body 140 and a display surface 160a of the display module 160 is exposed through the opening 144S of the second part 144.

The construction and material of the components of the electronic device 100a of the present embodiment are similar to those in the electronic device 100 of the previous embodiments and are therefore not repeated herein. The difference between the present embodiment and the previous embodiments lies in that the fringe 124a of the accommodating recess 122a of the electronic device 100a of the present embodiment forms two linear paths T extending across the first housing body 120. Specifically, the accommodating recess 122a of the electronic device 100 of the previous embodiments is a frame-shaped recess, whereas the accommodating recess 122a of the electronic device 100a of the present embodiment is a strip-shaped recess such that the fringe 124a of the accommodating recess 122a can form the two linear paths T extending across the first housing body 120.

Figure 4:
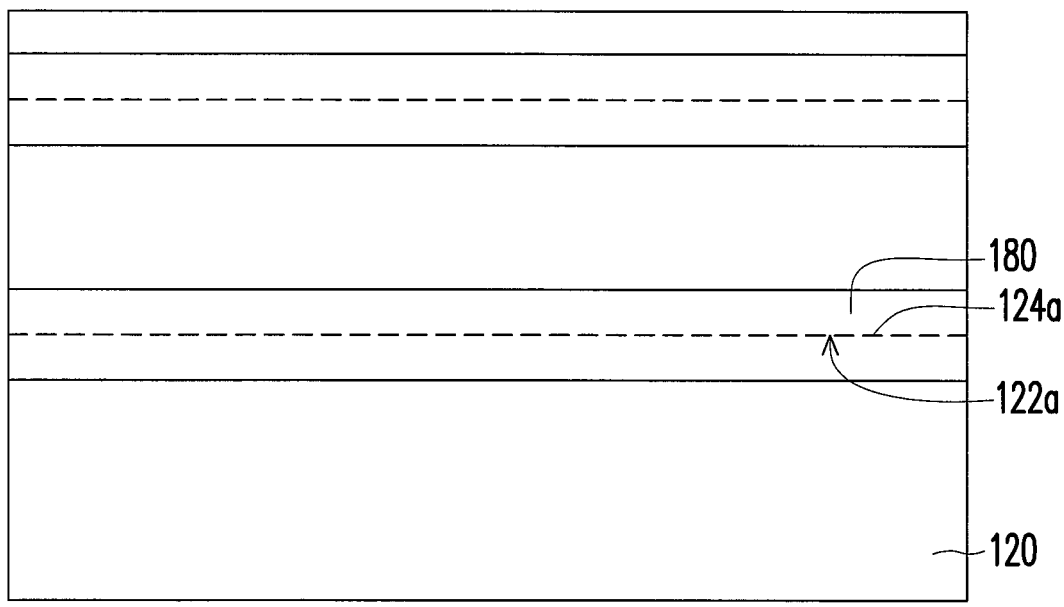
FIG. 4 illustrates a distribution of the accommodating recess and buffer of the electronic device according to one embodiment of the present invention.

FIG. 4 illustrates a distribution of the accommodating recess 122 and the buffer 180 of the electronic device 100a according to one embodiment of the present invention. Referring to FIG. 3B and FIG. 4, the electronic device 100a of the present embodiment further includes the buffer 180. The buffer 180, similar to the previous embodiment, is disposed on the second housing body 140 and between the display module 160 and the second housing body 140. When the electronic device 100a is in a closed position, the accommodating recess 122 is recessed away from the second housing body 140, and the buffer 180 substantially overlaps with a fringe 124 of the accommodating recess 122. Specifically, when the first housing body 120 and the second housing body 140 of FIG. 3B are stacked with each other so that they are in a closed state, the buffer 180 of the present embodiment, for example, overlaps with the fringe 124a of the accommodating recess 122a, and the buffer 180 continuously covers both the two linear paths T formed by the fringe 124a of the accommodating recess 122a. Alternatively, similar to FIG. 2C and FIG. 2D, the buffer 180 of the present embodiment may also segmentally overlap with the fringe 124a of the corresponding accommodating recess 122a or overlap with the entire area of the corresponding accommodating recess 122a.

In summary, in the present invention, the first housing body of the housing of the electronic device is provided with the accommodating recess, and the buffer corresponding to the fringe of the accommodating recess is disposed on the second housing body. When the electronic device is in a closed position, the display module is located between the first housing body and the first part of the second housing body. The buffer is located between the display module and the first part and substantially overlaps with the fringe of the accommodating recess. When the electronic device in the closed state is subject to an external force, a stress concentration on the display module caused by the fringe of the accommodating recess would be diminished because the buffer is located between the display module and the first part, and the hardness of the buffer is less than the hardness of the first housing body. As such, the occurrence of bright spot or breakage of the electronic device owing to the external force can be further reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A housing of an electronic device, comprising:
a first housing body defining an accommodating recess;
a second housing body assembled to the first housing body and adapted to be foldable relative to the first housing body; and
a plurality of buffers disposed on the second housing body, wherein, in a closed position, the second housing body and the first housing body are stacked with each other, the accommodating recess is recessed away from the second housing body, the buffers face the first housing body, and the buffers substantially overlap with a plurality of fringes of the accommodating recess, wherein at least one buffer is located right above each fringe of the accommodating recess.

2. The housing of the electronic device according to claim 1, wherein the fringe of the accommodating recess forms two linear paths extending across the first housing body.

3. The housing of the electronic device according to claim 1, wherein the fringes of the accommodating recess forms a closed pattern.

4. The housing of the electronic device according to claim 1, wherein the accommodating recess of the first housing body is adapted to accommodate a keyboard, a touch pad or a key.

5. The housing of the electronic device according to claim 1, wherein the second housing body comprises a first part and a second part assembled together, the buffers are disposed on the first part, and when the first housing body and the second housing body are closed, the second part is located between the first part and the first housing body.

6. The housing of the electronic device according to claim 5, wherein the second housing body is adapted to receive a display module, the display module is sandwiched between the first part and the second part, the buffers are located between the display module and the first part, and the second part defines an opening through which a display surface of the display module is exposed.

7. The housing of the electronic device according to claim 1, wherein the buffer forms a continuous pattern.

8. The housing of the electronic device according to claim 1, wherein the buffers form a discontinuous pattern having multiple segments.

9. The housing of the electronic device according to claim 1, wherein the buffers are formed by a sponge, a metal gasket or rubber.

10. The housing of the electronic device according to claim 1, wherein the hardness of each buffer is less than the hardness of the first housing body.

11. The housing of the electronic device according to claim 1, wherein the depth of the accommodating recess is substantially 1.6 mm to 2.0 mm.

12. An electronic device comprising:
a first housing body defining an accommodating recess;
a second housing body assembled to the first housing body and adapted to be foldable relative to the first housing body;
a display module received in the second housing body with the second housing body exposing a display surface of the display module; and
a plurality of buffers disposed on the second housing body and between the display module and the second housing body, wherein, in a closed position, the second housing body and the first housing body are stacked with each other, the accommodating recess is recessed away from the second housing body, the display surface faces the first housing body, and the buffers substantially overlap with a plurality of fringes of the accommodating recess, wherein at least one buffer is located right above each fringe of the accommodating recess.

13. The electronic device according to claim 12, further comprising an input interface disposed in the accommodating recess of the first housing body.

14. The electronic device according to claim 13, wherein the input interface comprises a keyboard, a touch pad or a key.

15. The electronic device according to claim 12, wherein the fringe of the accommodating recess forms two linear paths extending across the first housing body.

16. The electronic device according to claim 12, wherein the fringes of the accommodating recess forms a closed pattern.

17. The electronic device according to claim 12, wherein the buffer forms a continuous pattern.

18. The electronic device according to claim 12, wherein the buffers form a discontinuous pattern having multiple segments.

19. The electronic device according to claim 12, wherein the buffers are formed by a sponge, a metal gasket or rubber.

20. The electronic device according to claim 12, wherein the hardness of each buffer is less than the hardness of the first housing body.

21. The electronic device according to claim 12, wherein the depth of the accommodating recess is substantially 1.6 mm to 2.0 mm.

* * * * *